United States Patent [19]

Core

[11] Patent Number: 4,516,389

[45] Date of Patent: May 14, 1985

[54] ROUND HAY BALING MACHINE

[76] Inventor: Grant M. Core, Rte. #3, Knoxville, Iowa 50138

[21] Appl. No.: 646,460

[22] Filed: Sep. 4, 1984

[51] Int. Cl.³ ...................... A01D 59/00; A01D 89/00
[52] U.S. Cl. ......................................... 56/341; 56/190
[58] Field of Search ............... 56/341, 364, 16.1, 190; 100/88

[56] References Cited

U.S. PATENT DOCUMENTS

| | | | |
|---|---|---|---|
| 3,924,391 | 12/1975 | Cheatum | 56/364 |
| 4,304,090 | 12/1981 | Gavrilenko et al. | 56/190 |
| 4,422,373 | 12/1983 | Gaeddart | 56/341 |
| 4,446,684 | 5/1984 | Frimml et al. | 56/341 |
| 4,454,707 | 6/1984 | Rowayne et al. | 56/341 |

*Primary Examiner*—Gene Mancene
*Assistant Examiner*—John G. Weiss
*Attorney, Agent, or Firm*—Zarley, McKee, Thompte, Voorhees & Seas

[57] ABSTRACT

A round hay baling machine having a pickup assembly, a windguard assembly, a latch assembly, and a twine tie assembly is improved upon by connecting an elongated cable at opposite ends to the twine tie assembly and to the latch assembly. When an accumulation of hay becomes stuck between the pickup assembly and windguard assembly during operation of the machine, the twine tie assembly can be actuated from the tractor pulling the machine to pull on the cable thereby releasing the latch assembly to allow the windguard assembly to pivot away from the pickup assembly such that the accumulation of hay may pass therebetween into the baling chamber of the machine.

5 Claims, 8 Drawing Figures

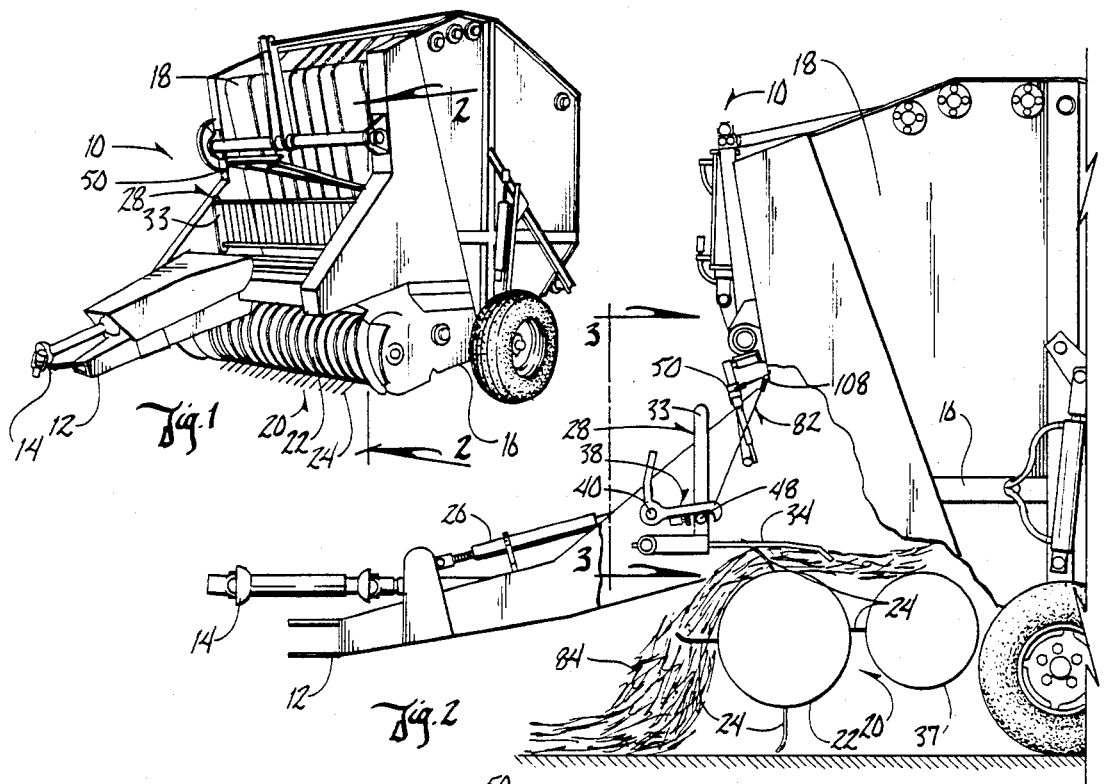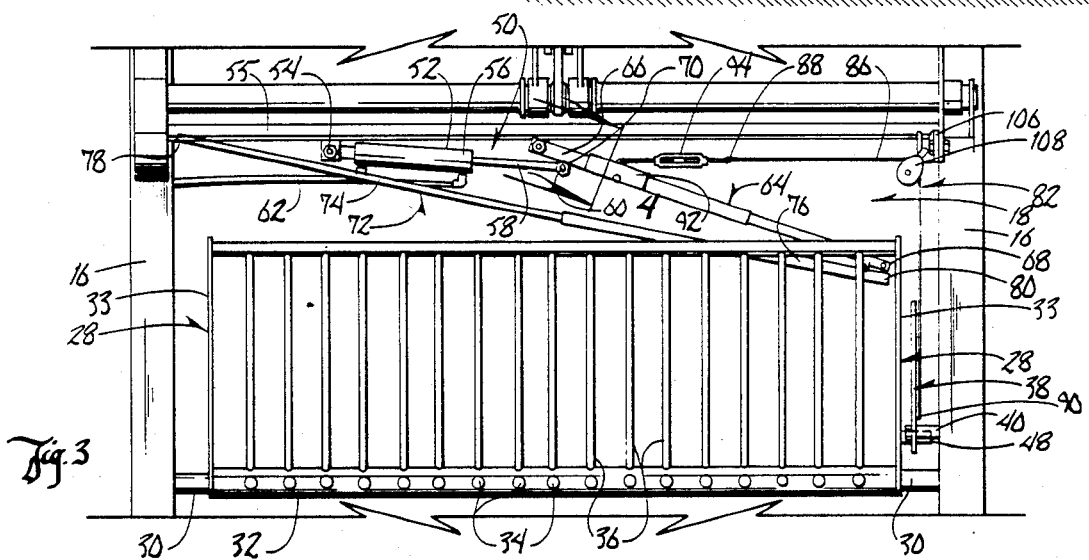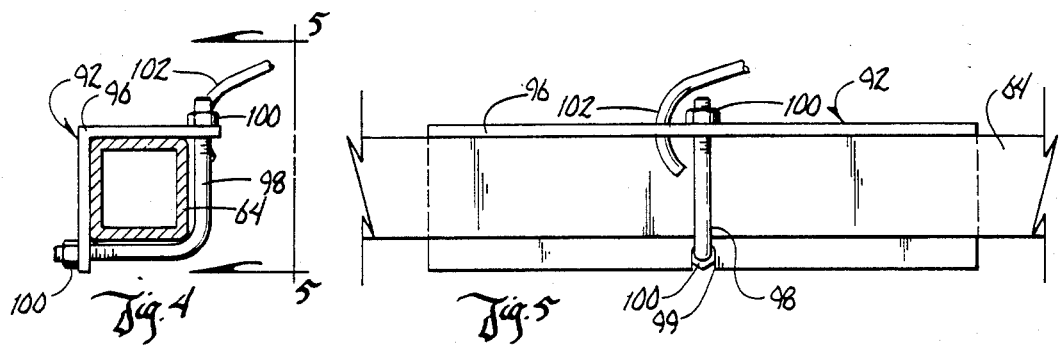

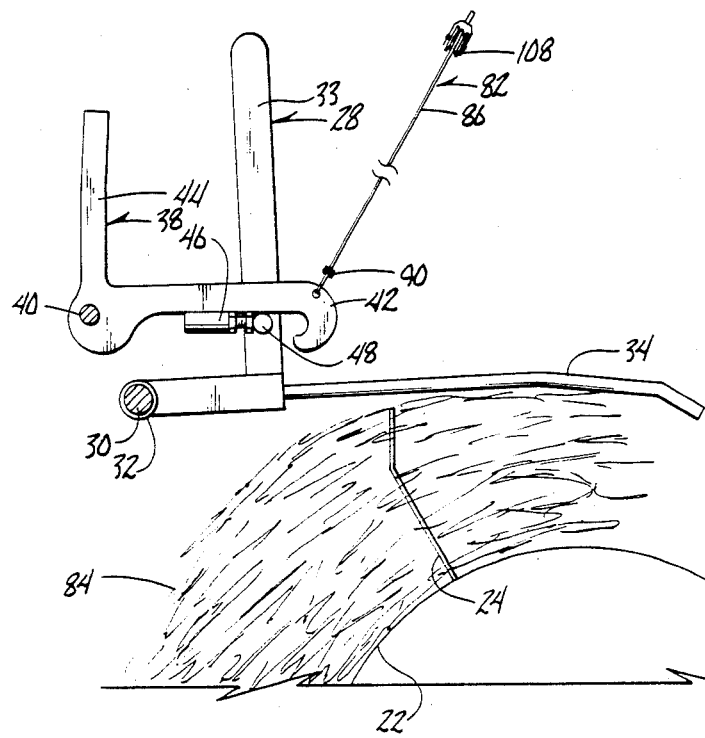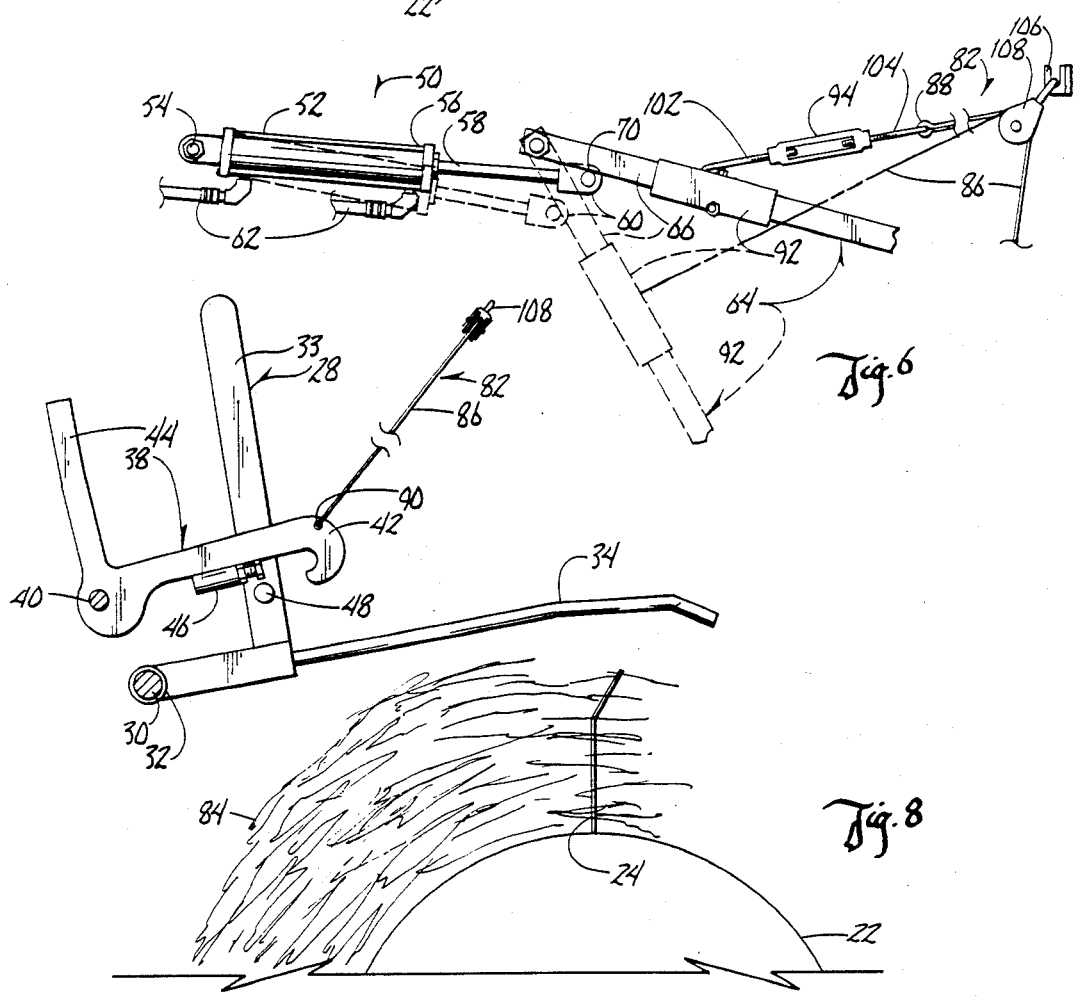

ROUND HAY BALING MACHINE

BACKGROUND OF THE INVENTION

Round hay baling machines are well known in the farming industry for picking up hay that has been cut in the field and forming it into large round bales. One problem associated with these machines is that large accumulations or slugs of hay often times become stuck or wedged in the machine between the pickup assembly and the windguard assembly. The operator then normally has to dismount from the tractor which pulls the baling machine and manually release the latch assembly of the machine and pull back on the windguard so that the slug of hay may pass into the baling compartment of the machine. The necessity of the operator physically removing the slug of hay adds considerable time to the baling process and subjects the operator to the hazards of the operating machine.

Therefore, it is a primary objective of the present invention to provide an improved round hay baling machine in which accumulations of hay stuck in the machine prior to admission into the baling chamber can be released without the operator leaving the tractor.

A further objective of the present invention is the provision of an improved hay baling machine wherein a slug of hay wedged in the machine can be released therefrom by actuation of the twine tie assembly of the machine.

A still further objective of the present invention is the provision of a cable assembly for releasing accumulations of hay for entry into the baling compartment which can be easily attached to the machine.

Another objective of the present invention is the provision of an improved hay baling machine which quickly, easily, and safely opens the windguard assembly to permit passage of slugs of hay therethrough.

These and other objectives will become apparent from the following description of the present invention.

SUMMARY OF THE INVENTION

A conventional round hay baling machine is improved by adding a cable assembly thereto which permits accumulations of hay which are stuck in the machine to be released therefrom without the need of the operator to dismount from the tractor pulling the machine. The hay baling machine includes a frame with forward and rearward ends and a large baling chamber supported on the frame to form the hay into large round bales. The machine also has a pickup assembly for picking up the cut hay from the field and is mounted on the frame forwardly of the baling chamber. A windguard assembly is pivotally connected to the frame above the pickup assembly. The frame also has a latch assembly pivotally secured thereto which includes a stop element for limiting the pivotal movement of the windguard. The hay is picked up by the pickup assembly and passed rearwardly between the pickup assembly and the windguard into the baling chamber wherein it is formed into large round bales. A twine tie assembly is provided which wraps twine around the completed bale to hold the bale together.

The improvement in the baling machine comprises an elongated cable having one end connected to the twine tie assembly and the other end connected to the latch assembly. Actuation of the hydraulic cylinder of the twine tie assembly exerts a pull on the cable such that the latch assembly is raised, thereby allowing the windguard assembly to pivot beyond the stop element such that any accumulation of hay stuck between the pickup assembly and the windguard assembly can pass therebetween and move rearwardly into the baling chamber.

BRIEF DESCRIPTION OF THE DRAWINGS

FIG. 1 is a perspective view of a conventional round hay baling machine.

FIG. 2 is a partial side elevational view of the improved hay baling machine of the present invention.

FIG. 3 is a front elevational view taken along line 3—3 of FIG. 2 showing the cable assembly improvement of the present invention.

FIG. 4 is a view taken along line 4—4 of FIG. 3.

FIG. 5 is a view taken along line 5—5 of FIG. 4.

FIG. 6 is an enlarged view showing the connection of the cable assembly to the twine tie assembly and the movement of the twine tie assembly when actuated.

FIG. 7 is an enlarged partial side elevational view showing the connection of the cable assembly to the latch assembly and the position of the windguard assembly when a slug of hay is stuck in the baling machine.

FIG. 8 is a view similar to that of FIG. 7 and shows the position of the windguard assembly after the twine tie assembly has been actuated so as to release the slug of hay from between the windguard assembly and the pickup assembly.

DETAILED DESCRIPTION OF THE DRAWINGS

The round hay baling machine of the present invention is generally designated by the numeral 10 in the drawings. Machine 10 is normally towed behind a farm tractor and includes a tongue frame 12 for connection to the tractor and a drive mechanism 14 operatively connected to the tractor to operate the baling machine. Machine 10 also includes a frame 16 which supports a large baling chamber 18 wherein the round bales of hay are formed.

A pickup assembly 20 is mounted upon frame 16 and includes a pickup reel 22 having a plurality of tines 24 thereon for picking up the hay which has been cut in the field. Height adjustment means 26 are provided to adjust the height of the pickup assembly. Also mounted on the frame is a standard windguard 28 which includes a shaft 30 extending between the opposite sides of frame 16, a bushing or collar 32 pivotally mounted upon shaft 30, side frame members 33 secured to bushing 32, a plurality of generally horizontally disposed bars 34 and a plurality of generally vertically disposed bars 36. The hay which is picked up by tines 24 passes over pickup reel 22 and under horizontal bars 34 and is deposited on a conveyor assembly 37 which conveys the hay into the baling compartment 18.

A latch assembly 38 is provided adjacent one end of windguard assembly 28 and includes a shaft 40 attached to frame 16 and about which a hook-shaped latch 42 is pivotally journaled. Latch assembly 38 may also include a handle 44. Latch assembly 38 has a stop element 46 secured thereto which normally limits the pivotal movement of windguard assembly 28 by engaging a stud 48 connected to framework 33 of windguard assembly 28.

The hay baling machine 10 also includes a twine tie assembly 50 which wraps a length of twine about the bale to help hold the bale together. Twine tie assembly 50 includes a hydraulic cylinder 52 having a first end 54 which is pivotally connected to a crossbar member 55 extending between and attached to opposite sides of machine frame 16. The second end 56 of hydraulic cylinders 52 has a piston rod 58 slideably extending therefrom which terminates in outer end 60. Standard hydraulic lines 62 are operatively attached to hydraulic cylinder 52 for supplying hydraulic fluid thereto.

Twine tie assembly 50 further includes a rigid twine wrapper activator 64 having a first end 66 pivotally attached to crossbar 55 and a spaced apart second end 68. Activator 64 is also pivotally connected to end 60 of piston rod 58 at a point 70 spaced slightly from first end 66.

Twine tie assembly 50 also includes a twine wrapper arm 72 comprised of a first elongated hollow rod 74 and a second hollow rod 76 slideably mounted upon rod 74. First rod 74 is connected at one end 78 to crossbar 55 adjacent frame 16 at a point remote from first end 54 of hydraulic cylinder 52. End 80 of second rod 76 is pivotally attached to second end 68 of activator 64. Thus, when hydraulic cylinder 52 is actuated to retract piston rod 58, activator 64 pivots downwardly about first end 66 and connection point 70 and thereby slides second rod 76 upwardly along first rod 74. Twine extending through rods 74 and 76 is then dispensed from end 80 of second rod 76 and wrapped around the hay bale in a conventional manner.

The foregoing structure is conventional and does not, per se, comprise the invention herein.

The conventional round hay baling machine 10 is improved upon by adding a cable means 82 which is connected at opposite ends to twine tie assembly 50 and latch assembly 42 so that the latch can be released by actuation of the twine tie assembly so as to raise the windguard assembly 28 when a slug of hay 84 becomes stuck in the machine. More particularly, cable assembly 82 includes an elongated cable 86 having first end 88 and second end 90. First end 88 of cable 86 is attached to twine wrapper activator 64 through the use of a collar device 92 and a turnbuckle 94. Collar device 92 is preferrably comprised of an angle iron 96 which is clamped to activator 64 by a short shaft 98 bent at right angles and threaded at opposite ends which pass through corresponding holes or slots 99 in angle iron 96 to receive a nut 100. Collar device 92 can alternatively be a single piece collar completely encircling activator 64 and held in place by a set screw or the like.

A turnbuckle 94 has a first end 102 which is received in a corresponding hole in angle iron 96 so as to attach turnbuckle 94 to angle iron 96 and a second end 104 to which is attached first end 88 of cable 86. A bracket 106 is attached to frame 16 by welding or the like and supports a pulley 108 through which cable 86 is directed. Second end 90 of cable 86 is attached to latch 42 in any convenient manner. Turnbuckle 94 can be adjusted to vary the cable distance between activator 64 and latch 42 as needed for operation of the improved baling machine.

In operating the baling machine 10 in the field, it is common for an accumulation or slug of hay 84 to become stuck in the machine between pickup reel 22 and horizontal bars 34 of windguard 28. Without the cable assembly 82 of the present invention, the operator of the machine must dismount from the tractor pulling the baling machine, manually release latch assembly 38, and pivot windguard assembly 28 upwardly and forwardly such that the slug of hay may pass into baling compartment 18. With the improvement of the present invention, the operator need merely to actuate twine tie assembly 50 from the tractor in the normal manner to release the accumulation of hay 84. The actuation of twine tie assembly 50 causes piston rod 58 to be retracted into cylinder 52 such that activator 64 is pivoted downwardly as seen by the doted lines in FIG. 6. As activator 64 pivotes downwardly, second end 90 of cable 86 is pulled in an upward direction to release the engagement between stop element 46 and stud 48 on windguard assembly 28 such that the windguard assembly can pivot in a counterclockwise direction, as seen in FIG. 8, thereby permitting the slug of hay 84 to pass between pickup reel 22 and horizontal bars 34 into baling chamber 18. After the slug has passed, windguard assembly 28 will pivot clockwise into its normal position as seen in FIG. 7 and twine tie assembly 50 can be deactuated to release the tension on cable 86 such that latch assembly 38 will pivot back into the position shown in FIG. 7 such that stop element 46 is in locking engagement with stud 48 of windguard assembly 28.

While the precise connections of cable assembly 82 at opposite ends to twine tie assembly 50 and latch assembly 38 may be varied without parting from the scope of the invention, it is seen that such a cable assembly can be easily mounted upon a conventional round hay baling machine for the easy and safe operation of the machine. The present invention therefore accomplishes at least all of the stated objective.

What is claimed is:

1. An improved round hay baling machine having a frame with forward and rearward ends, a baling chamber supported on said frame, a pickup assembly mounted on said frame forwardly of said baling chamber, a windguard assembly pivotally connected to said frame above said pickup assembly, a latch assembly pivotally secured to said frame and having a stop element for normally limiting the pivotal movement of said windguard, and a twine tie assembly operatively connected to said frame and including a hydraulic cylinder means having a first end pivotally connected to said frame and a spaced apart second end, a twine wrapper activator having a first end pivotally connected to said second end of said hydaulic cylinder means and a spaced apart second end, and an elongated twine wrapper arm having a first end pivotally connected to said frame and a second end pivotally connected to said activator such that actuation of said hydraulic cylinder means pivots said second ends of said activator and said wrapper arm downwardly, said improvement comprising:

cable means having first and second opposite ends attached to said twine tie assembly and to said latch assembly, respectively, such that actuation of said hydraulic cylinder means pulls on said cable means thereby raising said latch assembly to allow said windguard assembly to pivot beyond said stop element whereby an accumulation of hay passes beneath said windguard assembly into said baling chamber, first connection means for securing said first end of said cable means to said twine tie assembly, and second connection means for securing said second end of said cable means to said latch assembly.

2. The hay baler of claim 1 wherein said improvement further comprises a pulley means for directing said cable means between said twine tie assembly and said latch assembly and mounting means for mounting said pulley means on said frame.

3. The hay baler of claim 2 wherein said mounting means pivotally connects said pulley means to said frame.

4. The hay baler of claim 1 wherein said first connection means includes a collar secured to said twine wrapper activator and a turnbuckle having one end attached to said collar and an opposite end attached to said first end of said cable.

5. A method of releasing an accumulation of hay from a round hay baling machine, said machine having a frame with forward and rearward ends, a baling chamber supported on said frame, a pickup assembly mounted on said frame forwardly of said baling chamber, a windguard assembly pivotally connected to said frame and spaced above said pickup assembly, a latch assembly pivotally secured to said frame and having a stop element for normally limiting the pivotal movement of said windguard, a twine tie assembly operatively connected to said frame, and a cable means having first and second ends attached to said twine tie assembly and to said latch assembly, respectively, said accumulation of hay being stuck between said windguard assembly and said pickup assembly, said method comprising:

actuating said twine tie assembly to pull on said cable means and thereby raise said latch assembly to allow said windguard assembly to pivot beyond said stop element such that the space between said windguard assembly and said pickup assembly is enlarged for passage of said accumulation of hay therebetween.

* * * * *